United States Patent
Kilambi et al.

(10) Patent No.: US 10,855,327 B2
(45) Date of Patent: Dec. 1, 2020

(54) PARALLELIZED SUCCESSIVE INTERFERENCE CANCELLATION (PSIC) RECEIVER ARCHITECTURE FOR WIRELESS COMMUNICATIONS SYSTEMS

(71) Applicant: HUAWEI TECHNOLOGIES CO., LTD., Guangdong (CN)

(72) Inventors: Sai Mohan Kilambi, Nepean (CA); Lan Hu, Ottawa (CA); David Neal Wessel, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/290,146

(22) Filed: Mar. 1, 2019

(65) Prior Publication Data
US 2020/0280340 A1    Sep. 3, 2020

(51) Int. Cl.
H04L 25/03    (2006.01)
H04B 1/7107   (2011.01)

(52) U.S. Cl.
CPC ............................... H04B 1/71072 (2013.01)

(58) Field of Classification Search
CPC ................................................. H04B 1/71072
See application file for complete search history.

(56) References Cited

U.S. PATENT DOCUMENTS

| | | | |
|---|---|---|---|
| 7,068,743 B1 * | 6/2006 | Suzuki | ............... H04B 1/71075 370/335 |
| 8,694,851 B1 | 4/2014 | Sun et al. | |
| 2002/0061053 A1 | 5/2002 | Kim et al. | |
| 2004/0120299 A1 * | 6/2004 | Kidiyarova-Shevchenko | ............. H04B 1/7103 370/342 |
| 2012/0201279 A1 * | 8/2012 | Liberti, Jr. | ......... H04B 1/71072 375/148 |
| 2016/0329949 A1 * | 11/2016 | Cloutier | ............... H04B 7/0885 |

FOREIGN PATENT DOCUMENTS

WO    0171927 A2    9/2001

OTHER PUBLICATIONS

International Search Report and Written Opinion of PCT/CN2020/076880; Huajing Zhang; dated May 27, 2020.

* cited by examiner

Primary Examiner — Syed Haider
(74) Attorney, Agent, or Firm — BCF LLP (57) ABSTRACT

The disclosed systems, structures, and methods are directed to a wireless receiver. The configurations presented herein employ a signal encoding module to encode a plurality of received analog signals with an orthogonal code set and combine the encoded analog signals into a single encoded analog composite signal, an analog-to-digital conversion unit to convert the single encoded analog composite signal into a single encoded digital composite signal containing constituent digital signals. The presented configurations also include a bank of multiple successive interference cancellation (SiC) modules to sequentially remove the constituent digital signals from the single encoded digital composite signal until a single constituent digital signal remains and a decoding module configured to decode the remaining constituent digital signal from the single encoded digital composite signal.

18 Claims, 9 Drawing Sheets

PARALLELIZED SUCCESSIVE INTERFERENCE CANCELLATION (PSIC) RECEIVER ARCHITECTURE FOR WIRELESS COMMUNICATIONS SYSTEMS

CROSS-REFERENCE TO RELATED APPLICATIONS

This is the first application filed for the instantly disclosed technology.

FIELD OF THE INVENTION

The present invention generally relates to the field of wireless communications and, in particular, to a wireless communication receiver architecture employing a parallelized successive interference cancellation (PSiC) technique to optimize the decoding of a code division multiplexed (CDM) signal.

BACKGROUND

Typically, wireless communication receiver systems receive multiple analog data signals that have been encoded and modulated. These multiple analog data signals may be combined, in a receiver, using code division multiplexing (CDM) techniques employing a code set having a higher frequency rate than the modulated analog data signals. This combination yields an output signal that is spread across a wide bandwidth. The use of high code rates to spread the data signals enables the sharing of receiver hardware resources by combining multiple input signals to a single signal before being sampled by analog-to-digital (ADC) convertor.

However, it will be appreciated that the decoding operations of these high code rate signals presents certain challenges to wireless receiver systems. Namely, receiver systems need to employ hardware, software, and firmware elements that are capable of operating at higher speeds to properly process the high code rate signals. Furthermore, such decoding operations may effect error vector magnitude (EVM) performance.

These challenges may be exacerbated by certain proposed enhancements to existing wireless communication systems as well as next-generation wireless communication designs. Such enhancements and designs include the deployment of high sampling rate ADC to sample high code rate wideband signals. Such enhancements and designs potentially strain the receiver hardware and software processing resources.

SUMMARY

An object of the present disclosure is to provide a wireless receiver architecture for processing wireless analog signals. The disclosure of the wireless receiver architecture presented herein employs a signal encoding module to encode a plurality of received analog signals with an orthogonal code set and to combine the encoded analog signals into a single encoded analog composite signal, an analog-to-digital conversion unit to convert the single encoded analog composite signal into a single encoded digital composite signal containing constituent digital signals. The presented disclosure also includes a bank of multiple successive interference cancellation (SiC) modules to sequentially remove the constituent digital signals from the single encoded digital composite signal until a single constituent digital signal remains and a decoding module configured to decode the remaining constituent digital signal from the single encoded digital composite signal.

In accordance with other aspects of the present disclosure, there is provided a method of processing wireless signals. The disclosed wireless signal processing presented herein provides for encoding a plurality of received analog signals with an orthogonal code set and combining the encoded analog signals into a single encoded analog composite signal, and converting the single encoded analog composite signal into a single encoded digital composite signal containing constituent digital signals. The disclosure further provides sequentially removing, by a bank of multiple successive interference cancellation (SiC) modules, the constituent digital signals from the single encoded digital composite signal until a single constituent digital signal remains and decoding the remaining constituent digital signal from the single encoded digital composite signal.

BRIEF DESCRIPTION OF THE FIGURES

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments pertain.

Figure 1A:
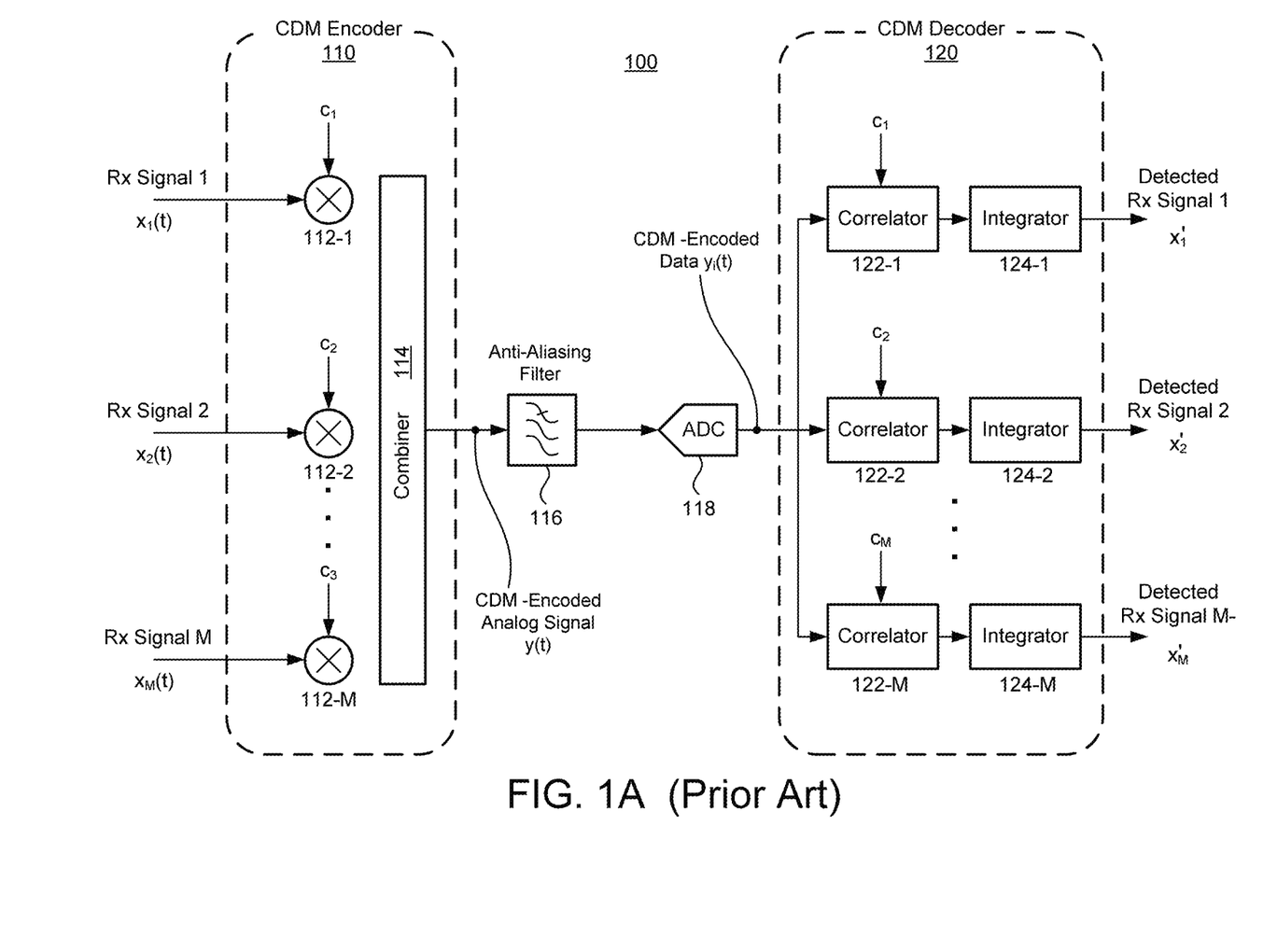
FIG. 1A depicts a high-level functional block diagram of a conventional CDM receiver architecture.

FIG. 1A illustrates a functional block diagram of an architecture of a conventional receiver 100 directed to processing received analog signals. The conventional receiver 100 includes a Code Division Multiplexer encoder module 110, anti-aliasing filter 116, analog-to-digital converter (ADC) 118, and a CDM decoder module 120. In turn, CDM encoder module 110 comprises analog mixing elements 112-1 . . . 112-M and a combiner unit 114. CDM Decoder module 120 comprises correlator elements 122-1 . . . 122-M and integrator elements 124-1 . . . 124-M. Other elements may be present but are not illustrated for purposes of simplicity of presentation.

As illustrated by FIG. 1A conventional receiver 100 receives M analog signals $x_1(t)$, $x_2(t)$ . . . $x_M(t)$, which may be received by one or more suitable structures, such as, for example, Multiple-Input-Multiple0Output (MIMO)/Massive MIMO (M-MIMO) antennas (not shown). Moreover, each of the received M analog signals may possess different modulation/encoding characteristics.

As shown, CDM encoder module 110, which is configured to receive, encode and convert the received M analog signals $x_1(t)$, $x_2(t)$ . . . $x_M(t)$ into a single, composite, encoded analog signal y(t). In particular, signals $x_1(t)$, $x_2(t)$ . . . $x_M(t)$ are respectively mixed with a code set comprising codes $c_1, c_2$ . . . $c_M$ via corresponding analog mixing elements 112-1 . . . 112-M. The encoded M analog signals are then combined, via combiner unit 114, to yield the single encoded analog signal y(t).

It will be appreciated that the code set $c_1, c_2$ . . . $c_M$ may be based on any orthogonal or pseudo-random noise (PN) codes such as, for example, Walsh, Hadamard, Gold, Barker codes, etc. These codes exhibit desirable coding characteristics and may be implemented at a coding rate $F_c$ that is substantially higher than the sampling rate $F_s$ of received analog signals $x_1(t)$, $x_2(t)$ . . . $x_M(t)$. In various implementations, coding rate $F_c$ is at least an order of magnitude greater than the signal sampling rate $F_s$. In so doing, CDM encoder module 110 outputs the single, encoded, high-rate analog signal y(t) that is effectively spread across a wide frequency bandwidth.

Figure 1B:
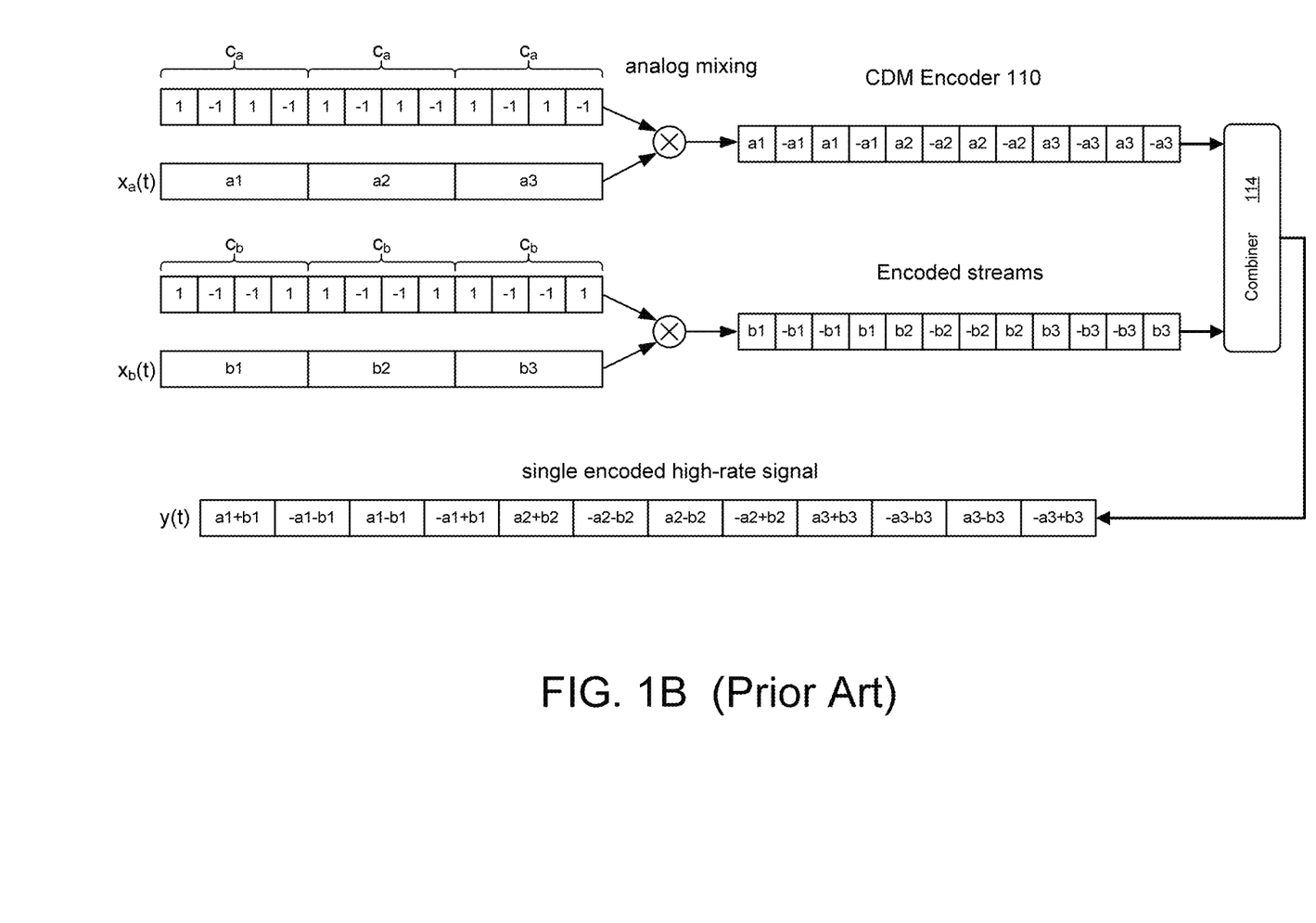
FIG. 1B depicts a representative example of a conventional CDM encoding technique.

By way of a non-limiting, illustrative example, consider two received analog signal streams: $x_a(t)$ comprising data symbols a1, a2, a3; and $x_b(t)$ comprising data symbols b1, b2, b3, as well as two orthogonal codes: $c_a$ comprising [1, −1, 1, −1]; and $c_b$ comprising [1, −1, −1, 1], as depicted in FIG. 1B. As noted above, CDM encoder module 110 operates to mix the analog symbols of $x_a(t)$, $x_b(t)$ with orthogonal codes of $c_a$, $c_b$ respectively to generate the encoded streams shown in FIG. 1B. The encoded streams are then supplied to combiner unit 114 to output the single, encoded, wideband analog signal y(t) as shown below.

118. ADC 118 converts the filtered encoded analog signal y(t) into an encoded, wideband, digital composite signal $y_1(t)$.

After the digital conversion, the encoded wideband digital signal $y_i(t)$ may be transmitted downstream for further processing, such as, for example, decoding operations performed by CDM decoder module 120. CDM decoder module 120 processes encoded digital composite signal $y_i(t)$ to decode and segregate the $y_i(t)$ signal into digital signals $x'_1$, $x'_2$ . . . $x'_M$ that contain the information content of the received M analog signals $x_1(t)$, $x_2(t)$ . . . $x_M(t)$.

In the particular embodiment illustrated in FIG. 1A, encoded digital composite signal $y_i(t)$ is forwarded to respective correlator elements 122-1 . . . 122-M of CDM decoder module 120. Each of the correlator elements 122-1_122-M is provided with a corresponding code from the code set $c_1, c_2$ . . . $c_M$, which is mixed with signal $y_i(t)$ to generate correlated mixed digital samples. The correlated mixed digital samples are subsequently processed by respective integrating elements 124-1 . . . 124-M to integrate (i.e., average) the digital samples to produce signals $x'_1$, $x'_2$ . . . $x'_M$ that manifest the information content of the received M analog signals $x_1(t)$, $x_2(t)$ . . . $x_M(t)$.

Figure 1C:
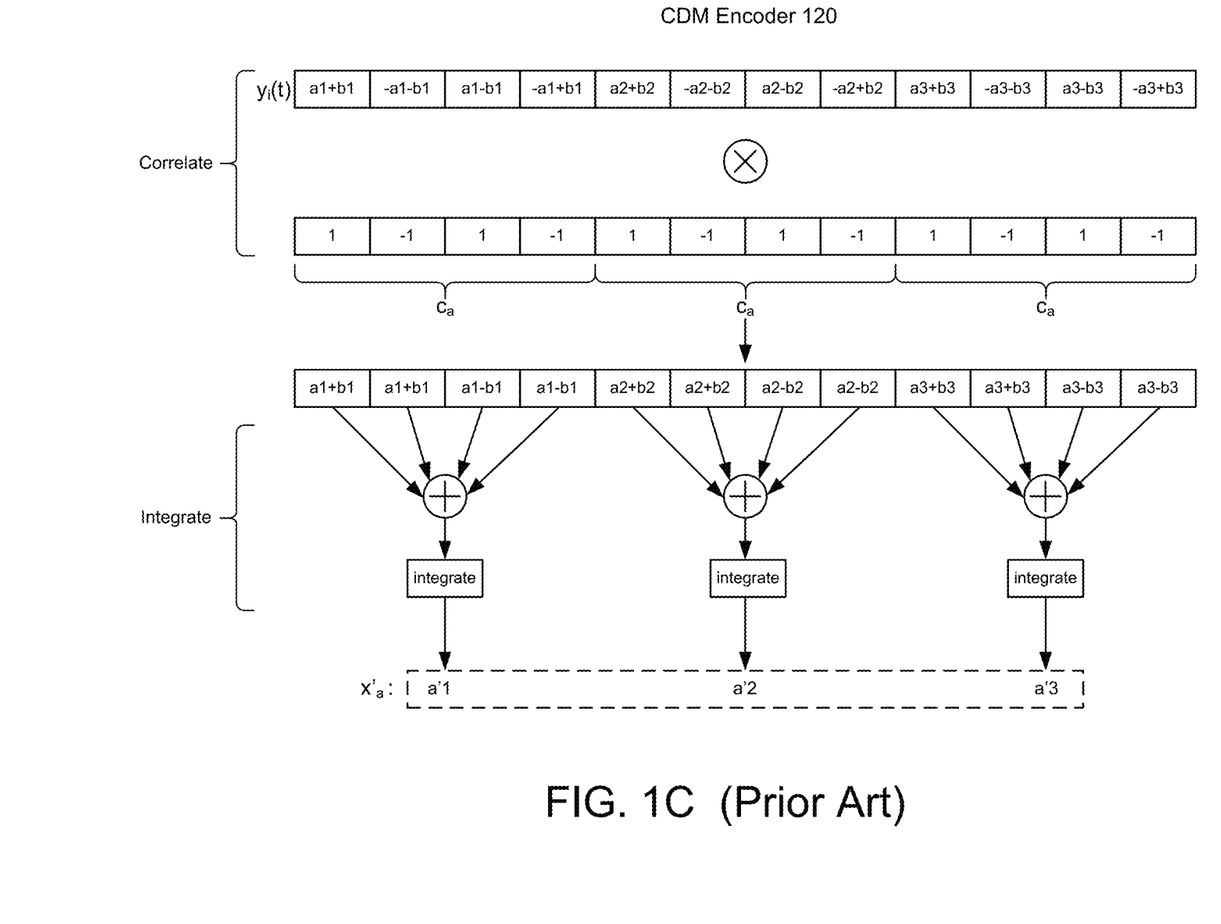
FIG. 1C depicts a representative example of a conventional CDM decoding technique.

An example of a CDM decoding operation, that may be used in conjunction with the CDM encoding example of FIG. 1B, is presented in FIG. 1C. FIG. 1C demonstrates the resolution of $y_i(t)$ into digital signal $x'_a$ manifesting the information content of received analog signal $x_a(t)$. As shown, CDM decoder module 120 operates to mix and correlate encoded digital composite signal $y_i(t)$ with orthogonal code $c_a$ to generate the correlated digital symbols shown in FIG. 1C. The correlated digital symbols are then combined and integrated to output digital signal $x'_a$ comprising digital symbols a'1, a'2, a'3, as shown in FIG. 1C. In this manner, the combing and integration processes operate to cancel out the other constituent signals, as they are modulated by other orthogonal codes, to produce digital symbols a'1, a'2, a'3 manifesting the information content of received analog data symbols a1, a2, a3.

It will be appreciated that the correlations noted above which, in theory, effectively cancel out irrelevant signal components during decoding operations, are difficult to achieve in practice. A contributing factor is that encoding operations occur in the analog domain while decoding operations occur in the digital domain. It is further assumed that the analog symbols do not change during code length periods. However, in practice, the analog symbols may experience changes during the code length periods which, during the digital code correlation and integration processes, introduce remnants from other symbols causing interference errors.

These interference errors may be reduced by increasing the code rate to incrementalize the symbol changes during the code length period. However such increases in code rate may become too expensive from hardware and implemen- $$y(t) = \boxed{a1+b1}\boxed{-a1-b1}\boxed{a1-b1}\boxed{-a1+b1}\boxed{a2+b2}\boxed{-a2-b2}\boxed{a2-b2}\boxed{-a2+b2}\boxed{a3+b3}\boxed{-a3-b3}\boxed{a3-b3}\boxed{-a3+b3}$$

Returning to FIG. 1A, the single encoded analog signal y(t) may then be provided to anti-aliasing filter (AAF) 116. AAF 116 acts to restrict the bandwidth of interest and mitigate signal components that may lead to aliasing effects. The filtered encoded analog signal (the output of AAF 116) may then be supplied to analog-to-digital converter ADC tation perspectives. Furthermore, increases in the code rate may further strain the constituent modules and components (e.g., analog mixers, ADCs, etc.) of conventional receiver 100.

Figure 2A:
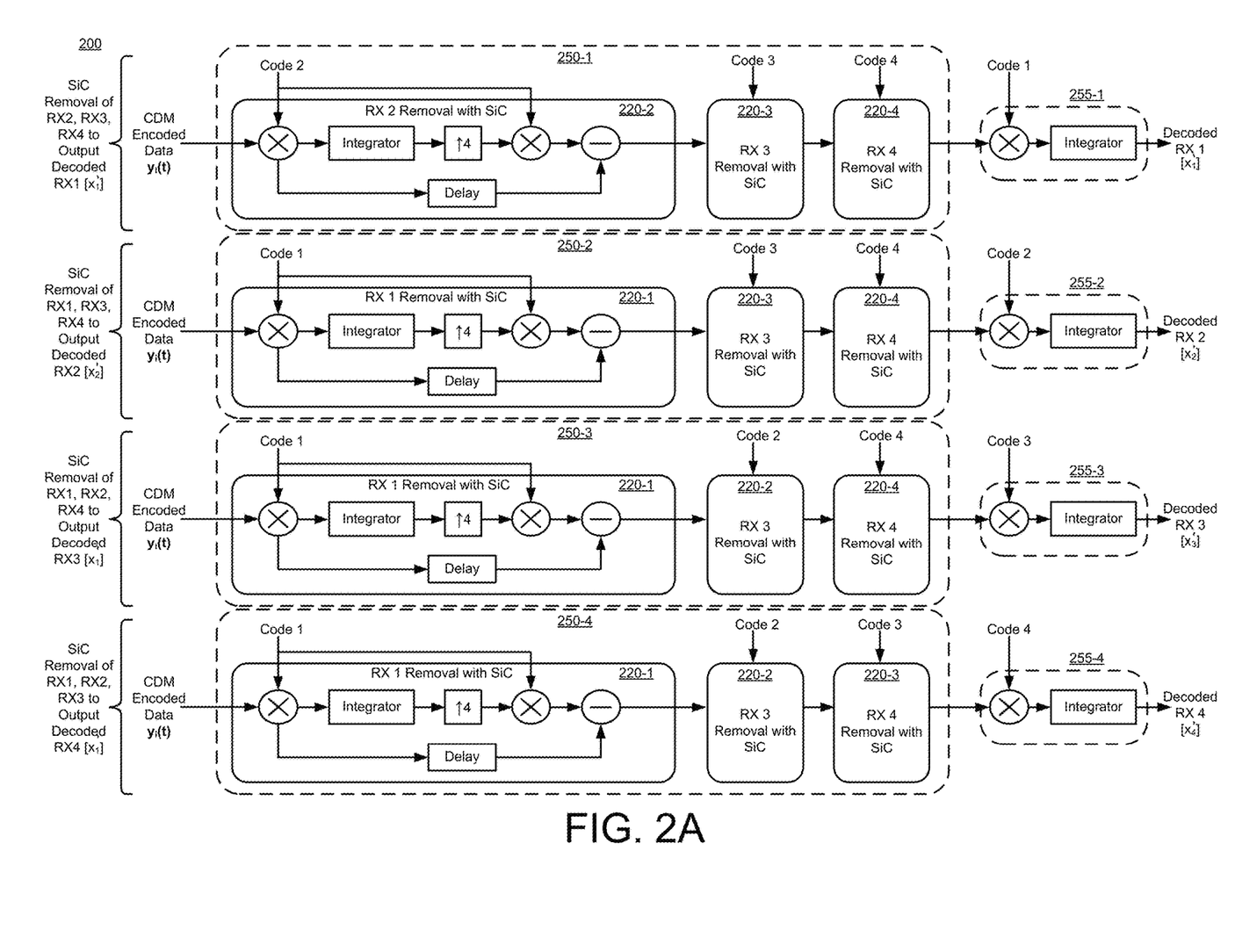
FIG. 2A depicts a functional block diagram of parallelized successive interference cancellation (PSiC) receiver decoding architecture, in accordance with various embodiments of the present disclosure.

FIG. 2A depicts a functional block diagram of parallelized successive interference cancellation (PSiC) receiver 200, in accordance with various embodiments of the present disclosure. PSiC receiver 200 operates to digitally extract and decode a digital signal of interest from encoded wideband digital signal $y_i(t)$ by removing, in a parallel and successive manner, interfering contributions from other digital signals imbedded in wideband digital signal $y_i(t)$.

In other words, each of the parallel paths of PSiC receiver 200 treats all but the one digital signal of interest as interfering signals. In operation this results in the successive removal of each of the interfering signals, until only the digital signal of interest remains. In so doing, as each of the interfering signals is sequentially decoded and removed, the error vector magnitude (EVM) of the last digital signal to be decoded (i.e., the digital signal of interest) will exhibit the least interference from the other previously decoded signals.

As shown in FIG. 2A, PSiC receiver 200 has a plurality of parallel paths, each of which incorporates multiple successive interference cancellation (SiC) modules 220. Each of the SiC modules 220 operates to remove the interfering contributions from other digital signals based on an applied orthogonal code. By sequentially implementing SiC modules 220 along each parallel path, PSiC receiver 200 successively proceeds to cancel each interfering signal during decoding operations, until the digital signal of interest remains.

Figure 2B:
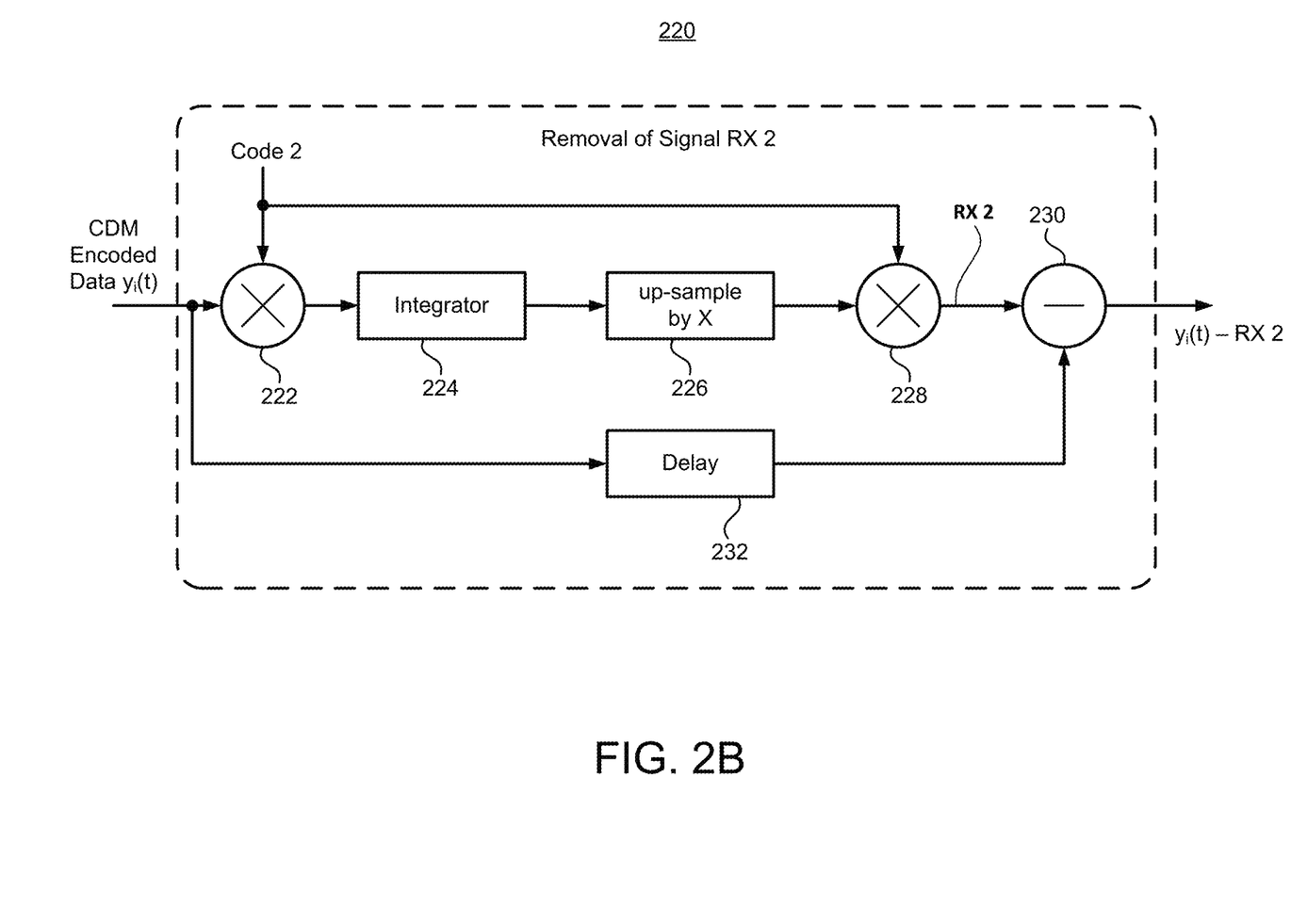
FIG. 2B illustrates a basic decoding and interference cancellation module incorporated by the PSiC receiver decoding architecture, in accordance with various embodiments of the present disclosure.

FIG. 2B illustrates the basic SiC module 220, in accordance with the embodiments of the present disclosure. In the depicted embodiment, SiC module 220 operates to remove signal RX 2 from wideband digital signal $y_i(t)$. SiC module 220 comprises first mixing element 222, integrator unit 224, up-sampling unit 226, second mixing element 228, subtracting element 230, and delay element 232.

As shown, first mixing element 222 receives encoded wideband digital signal $y_i(t)$ and is configured to mix signal $y_i(t)$ with the same orthogonal code that signal RX 2 was initially encoded with, in this case, orthogonal code 2 and combine the resultant signal. In so doing, first mixing element 222 removes all signals but signal RX 2. The mixed signal $y_i(t)$ is supplied to integrator unit 224 which effectively averages the mixed signal over a number of samples. As a result, the output of integrator unit 224 is an effectively down-sampled decoded version of signal RX 2. The averaged signal is then up-sampled by up-sampling unit 226 by a multiple equivalent to the number of averaged samples to compensate for the down-sampling effects of integrator unit 224.

The up-sampled signal is subsequently mixed again with orthogonal code 2 by second mixing element 228 to generate encoded signal RX 2. The encoded signal RX 2 is then forwarded to subtracting element 230.

SiC module 220 further supplies a copy of wideband digital signal $y_i(t)$ to a delay element 232. The delay introduced by delay element 232 is commensurate with the processing time required first mixing element 222, integrator unit 224, up-sampling unit 226, second mixing element 228. The delayed version of wideband digital signal $y_i(t)$ is provided as an input to subtracting element 230 which operates to subtract encoded signal RX 2 from wideband digital signal $y_i(t)$. Thus, the output of SiC module 220 is $y_i(t)$ with signal RX 2 substantially removed, namely, $y_i(t)-$RX 2.

Given the basic SiC module 220 described above, for M encoded signals, PSiC receiver 200 sequentially incorporates M−1 SiC modules 220 along each of the M parallel paths to successively remove interfering contributions of M−1 signals, until the last digital signal to be decoded (i.e., the digital signal of interest) remains. This systematic process is executed in parallel form by the M paths of PSiC receiver 200 to decode all of the M digital signals.

With this said, FIG. 2A provides an exemplary scenario of PSiC receiver 200 incorporating SiC modules 220-1 to 220-4 to decode four signals, $x'_1$ (RX1), $x'_2$ (RX2), $x'_3$ (RX3), and $x'_4$ (RX4) from encoded wideband digital signal $y_i(t)$. In particular, for the first parallel path, PSiC receiver 200 employs a first bank 250-1 of sequentially implemented SiC modules 220-2, 220-3, and 220-4 that operate to respectively and successively remove interfering contributions from signals $x'_2$ (RX2), $x'_3$ (RX3), and $x'_4$ (RX4) from encoded wideband digital signal $y_1(t)$. This effectively extracts/decodes the first signal of interest, $x'_1$ (RX1) from the wideband digital signal $y_1(t)$.

In particular, SiC module 220-2 of first bank 250-1 receives and processes wideband digital signal $y_i(t)$ to effectively remove contributions from signal $x'_2$ (RX2). The SiC module 220-2 resulting signal, namely, $[y_i(t)-x'_2$ (RX2)] is supplied to SiC module 220-3 which operates in similar fashion to remove contributions from signal $x'_3$ (RX3) to produce resulting signal $[y_i(t)-x'_2$ (RX2)$-x'_3$ (RX3)]. In turn, the SiC module 220-3 resulting signal is supplied to SiC module 220-4 which, again, operates in similar fashion to remove contributions from signal $x'_4$ (RX4) to produce resulting signal $[y_i(t)-x'_2$ (RX2)$-x'_3$ (RX3)$-x'_4$ (RX4)]. At this stage, after removing interfering contributions from signals $x'_2$ (RX2), $x'_3$ (RX3), and $x'_4$ (RX4), only the signal of interest, namely $x'_1$ (RX1), remains in signal $y_1(t)$.

PSiC receiver 200 then supplies signal $y_i(t)$ containing only remaining $x'_1$ (RX1) to decoder module 255-1, which operates to decode and extract $x'_1$ (RX1). In particular, decoder module 255-1 mixes signal $y_i(t)$ with the same orthogonal code that the $x_1(t)$ signal was initially encoded with (i.e., orthogonal code 1) to generate a correlated digital signal. The correlated digital signal is then integrated to produce $x'_1$, manifesting the desired digital information content of received analog signal $x_1(t)$.

In similar fashion, as depicted by FIG. 2A, PSiC receiver 200 implements second, third, and fourth banks 250-2, 250-3, 250-4 in parallel form to systematically remove interfering contributions of signals that are not signals of interest for each corresponding parallel path. The signal of interest that remains in signal $y_i(t)$ after the processing by corresponding banks 250-2, 250-3, 250-4 are subsequently decoded and extracted by respective decoder modules 255-2, 255-3, 255-4.

In this manner, PSiC receiver 200 effectively extracts and decodes a specific digital signal of interest in a parallel and successive manner, by removing interfering contributions from other digital signals imbedded in wideband digital signal. It will be appreciated that PSiC receiver 200 may be implemented by software constructs to facilitate integration with existing receiver architectures, for example, the architecture of conventional receiver 100. It will further be appreciated that, while the modules and components of PSiC receiver 200 have been described and depicted as discrete elements for simplicity purposes, such modules and components may be shared, combined, and/or integrated without departing from the disclosed concepts.

Figure 3:
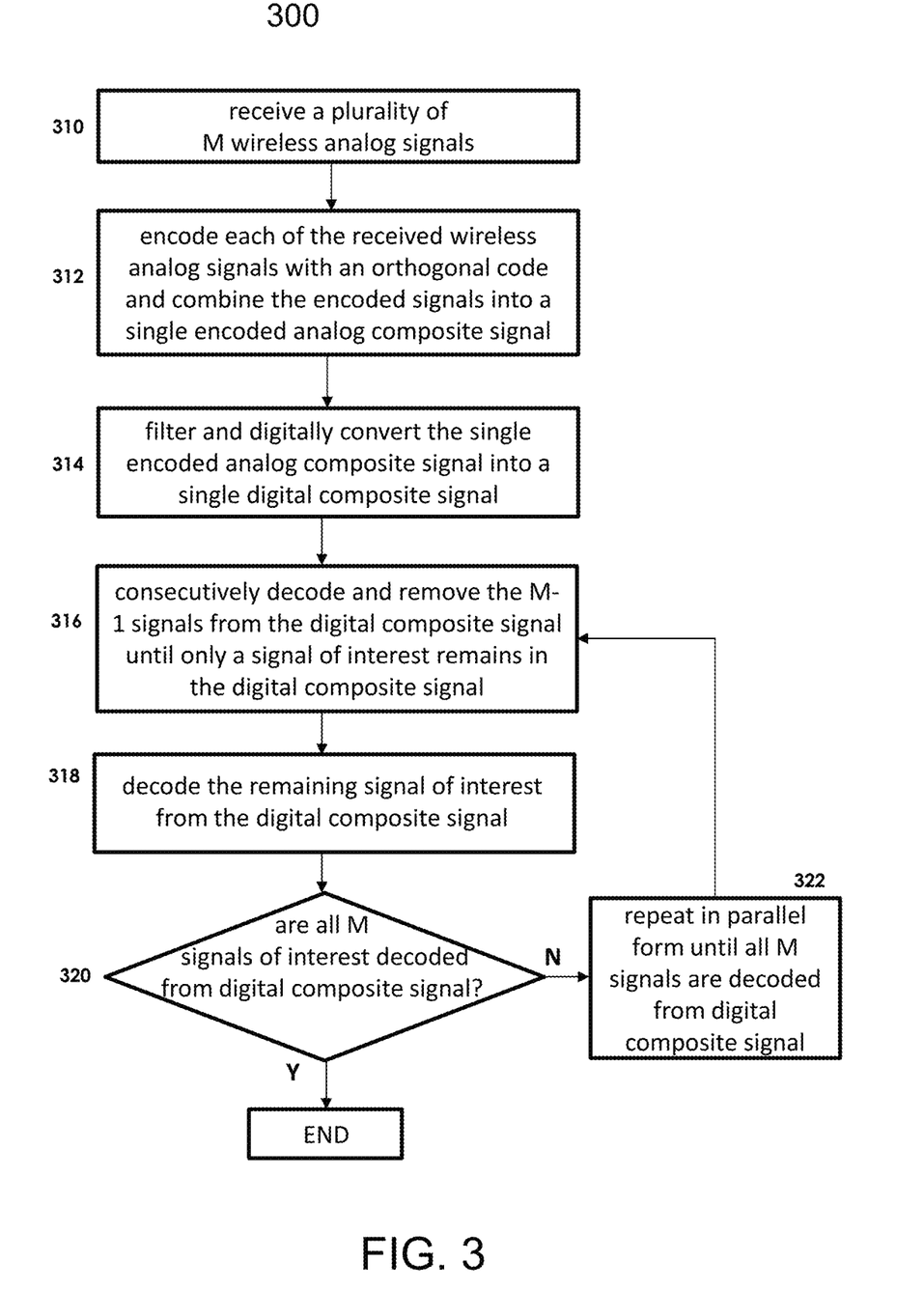
FIG. 3 depicts a functional flow diagram of PSiC-based receiver decoding processing, in accordance with various embodiments of the present disclosure.

FIG. 3 depicts a functional flow diagram of process 300 directed to the operations of PSiC-based receiver, in accordance with various embodiments of the present disclosure. As shown, process 300 begins at task block 310, in which PSiC receiver 200 receives a plurality of analog signals containing desired information content. As noted above, each of the received analog wireless signals may possess different modulation/encoding attributes.

Process 300 proceeds to task block 312, where the plurality of received signals are encoded by mixing the received signals with orthogonal codes via analog mixing elements. The encoded analog signals are subsequently combined by combiner unit to produce a single analog composite signal.

At task block 314, process 300 operates to filter the single analog composite signal and generate a single digital composite signal. As described above, anti-aliasing filter performs filtering operations to restrict the bandwidth of interest and mitigate signal components that may lead to aliasing. The filtered encoded analog signal is then supplied to analog-to-digital converter ADC, which operates to convert the filtered encoded analog signal y(t) into an encoded, wideband, digital composite signal $y_t(t)$.

Process 300 advances to task block 316, where PSiC receiver 200 operates to successively decode and remove digital signals within the digital composite signal $y_t(t)$ in a sequential manner until only the signal of interest remains in digital composite signal $y_t(t)$. That is, as shown in FIG. 2A, PSiC receiver 200 sequentially incorporates a bank of multiple SiC modules 220 along a path, in which each of the SiC modules 220 operates to remove the interfering contributions from a digital signal based on an applied orthogonal code, until only the digital signal of interest remains. Then, at task block 318, PSiC receiver 200 decodes the remaining digital signal of interest from composite signal $y_t(t)$.

At decision block 320, process 300 determines whether all of the M digital signals of interest have been decoded from composite signal $y_t(t)$. If YES, process 300 ends; if NO, process 300 progresses to task block 322, in which the successive removal/decoding operations of task block 316 is repeated in parallel fashion for all PSiC receiver 200 paths until all of the digital signals imbedded in composite digital signal $y_t(t)$ are resolved and decoded. As shown in FIG. 2A, the sequential bank of multiple SiC modules 220 are implemented for each parallel path of PSiC receiver 200 until all signals (e.g., $x'_1$ (RX1), $x'_2$ (RX2), $x'_3$ (RX3), and $x'_4$ (RX4)) are resolved and decoded from composite digital signal $y_1(t)$.

Figure 4A:
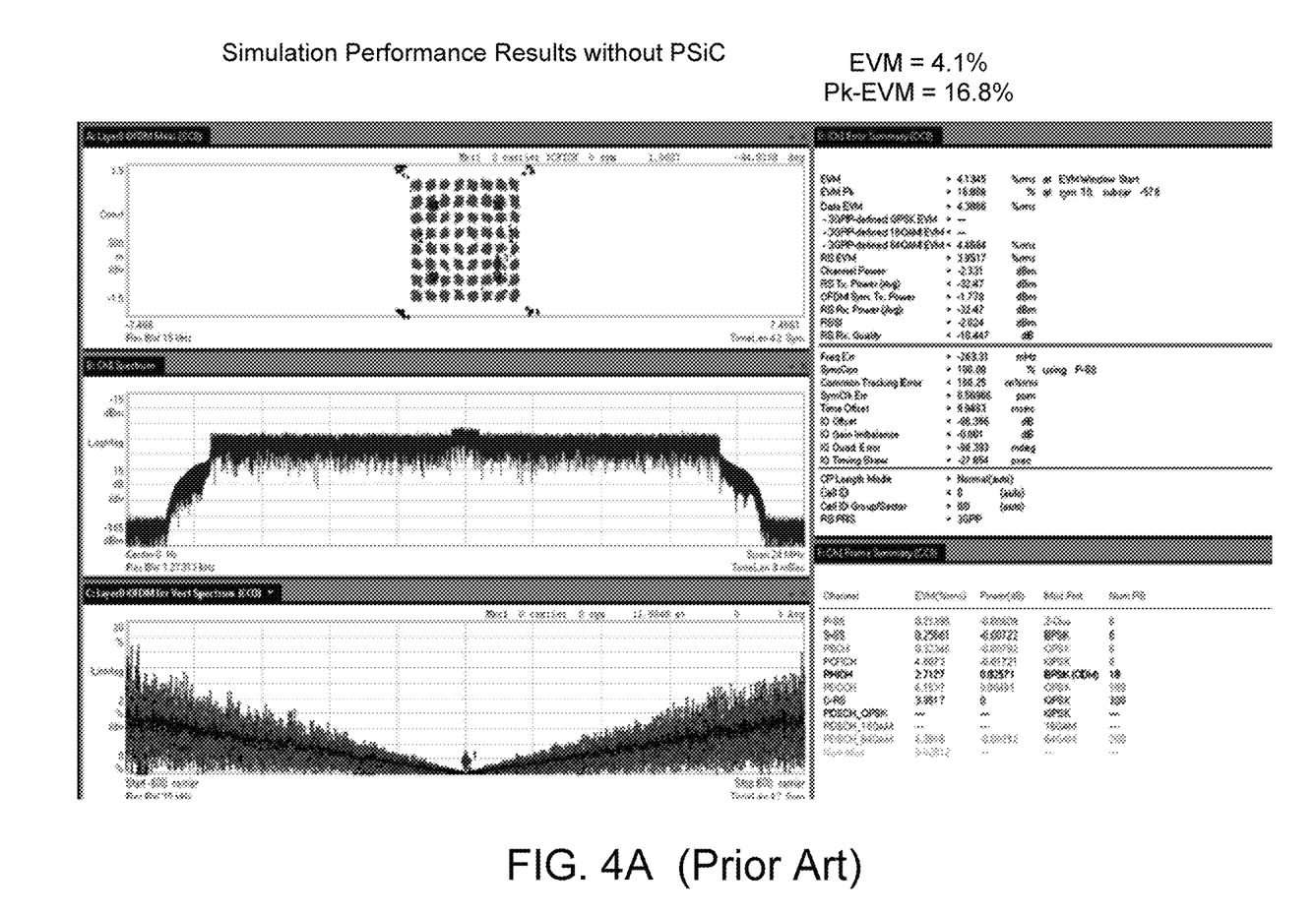
FIG. 4A illustrates a representative simulation trial performance result of conventional CDM decoder processing at a standard code rate.

FIG. 4A illustrates a representative simulation trial result of conventional CDM decoder processing (i.e., without PSiC decoding). The simulation trial applied a non-limiting, exemplary scenario comprising four 20 MHz LTE OFDM signals employing a code rate $F_c$ that is 32 times the signal sampling rate $F_s$ (i.e., $F_c=32\times F_s$). For this scenario, the conventional CDM decoder processing resulted in an average error vector magnitude (EVM) performance of 4.1% and a peak EVM performance 16.8%.

Figure 4B:
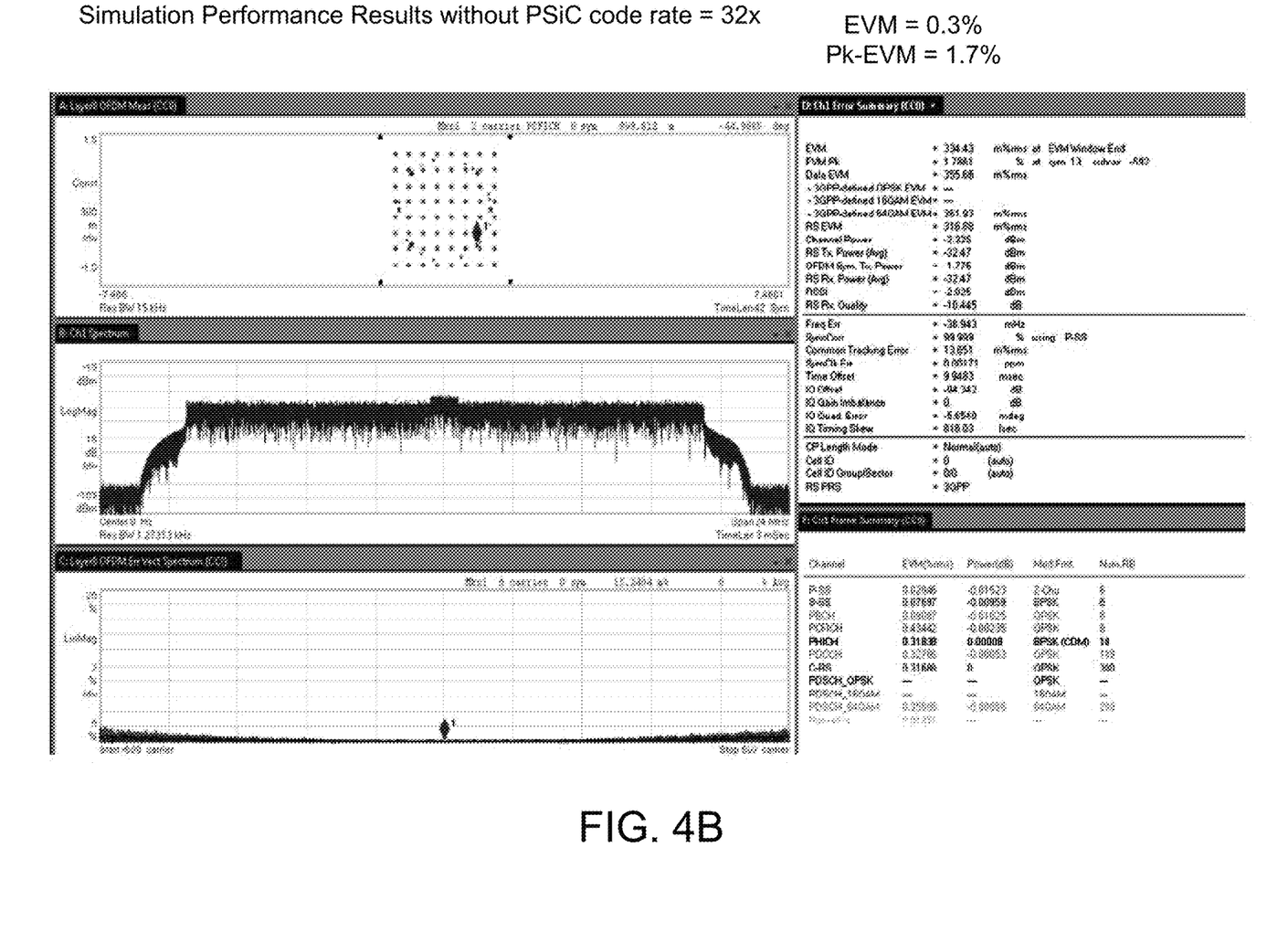
FIG. 4B illustrates a representative simulation trial performance result PSiC decoder processing at a standard code rate, in accordance with various embodiments of the present disclosure.

FIG. 4B illustrates a representative simulation trial result of PSiC decoder processing at the standard code rate (i.e., $F_c=32\times F_s$), in accordance with various embodiments of the present disclosure. Employing the identical simulation scenario, the PSiC decoder processing resulted in an average EVM performance of 0.3% and a peak EVM performance 1.7%.

Figure 4C:
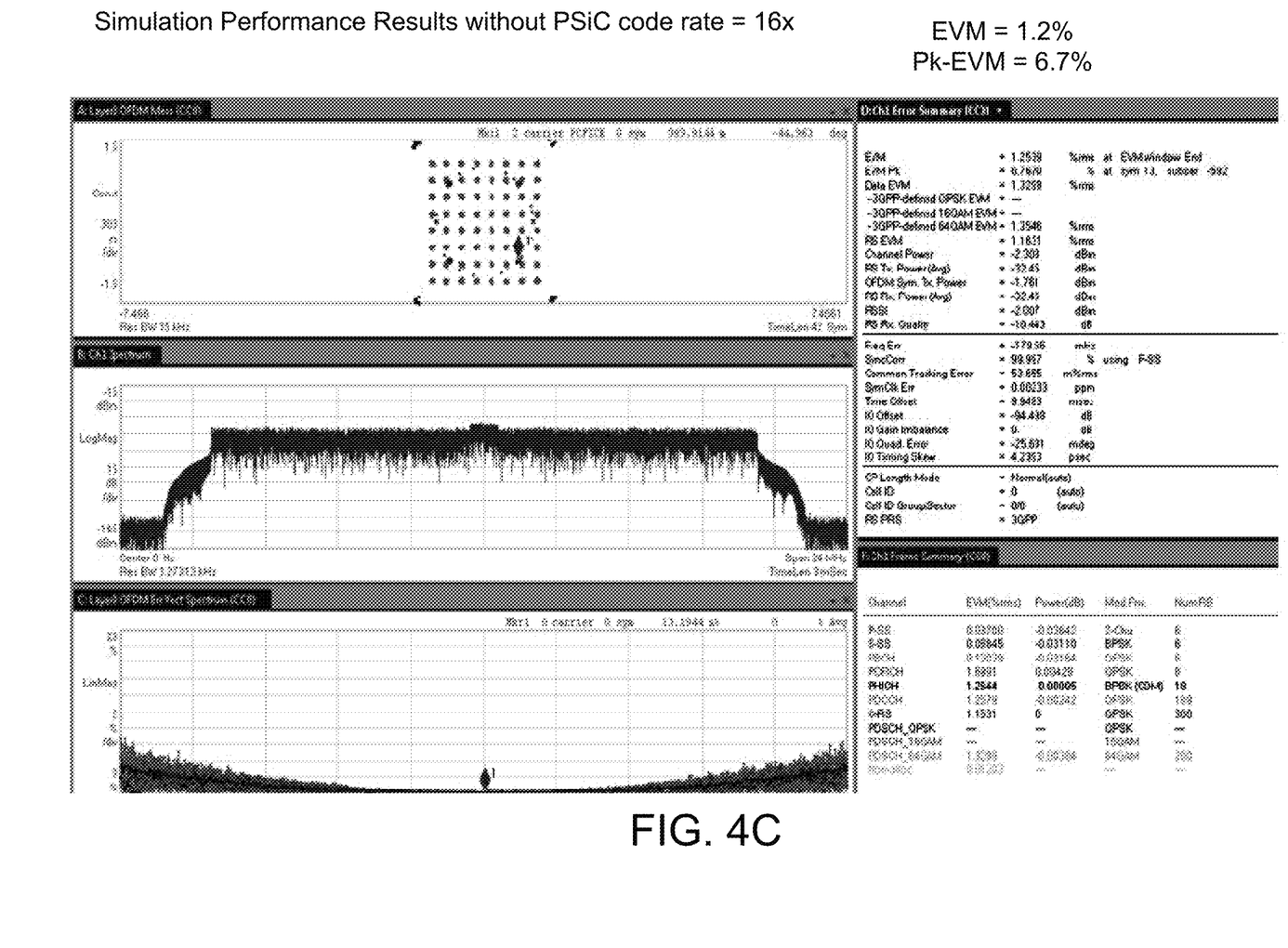
FIG. 4C illustrates a representative performance of simulation trial performance result PSiC decoder processing at a reduced code rate, in accordance with various embodiments of the present disclosure.

FIG. 4C illustrates a representative performance of simulation trial result PSiC decoder processing at a reduced code rate (i.e., $F_c=16\times F_s$), in accordance with various embodiments of the present disclosure. Even with the reduction of the code rate by half, the PSiC decoder processing still demonstrated a substantial improvement over conventional CDM decoder processing by yielding an average EVM performance of 1.2% and a peak EVM performance of 6.7%.

It is to be understood that the operations and functionality of the described wireless receiver architecture, constituent components, and associated processes may be achieved by hardware-based, software-based, firmware-based elements and/or combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A wireless receiver, comprising:
   a signal encoding module configured to encode a plurality of received analog signals with an orthogonal code set and combine the encoded analog signals into a single encoded analog composite signal;
   an analog-to-digital conversion unit configured to convert the single encoded analog composite signal into a single encoded digital composite signal containing constituent digital signals;
   a plurality of banks comprising successive interference cancellation (SiC) modules, each of the SiC banks including multiple SiC modules configured to sequentially remove the constituent digital signals from the single encoded digital composite signal until, for each of the SiC banks, a different single constituent digital signal remains, wherein each of the multiple SiC modules within each SiC bank is configured to remove a respective one of the constituent digital signals and to provide a succeeding SiC module the single encoded digital composite signal without the removed respective one constituent digital signal; and
   a plurality of decoding modules, each of the decoding modules operative to receive the single encoded digital composite signal from a corresponding SiC bank and configured to decode the remaining constituent digital signal from the single encoded digital composite signal for each of the SiC banks.

2. The wireless receiver of claim 1, further comprising a filter to minimize aliasing effects of the single encoded analog composite signal.

3. The wireless receiver of claim 1, wherein each of the multiple SiC modules within each SiC bank comprises:
   a first mixing element configured to mix the single encoded digital composite signal with an orthogonal code corresponding to the particular constituent digital signal;
   an integrator unit configured to integrate the mixed encoded digital composite signal;
   an up-sampling unit configured to up-sample the integrated mixed encoded digital composite signal;
   a second mixing element configured to mix the up-sampled encoded digital composite signal with the corresponding orthogonal code to produce the particular constituent digital signal; and
   a subtracting element configured to remove the particular constituent digital signal from the single encoded digital composite signal.

4. The wireless receiver of claim 3, further comprising a delay element applied to the single encoded digital composite signal forwarded to the subtracting element to compensate for processing delays.

5. The wireless receiver of claim 1, wherein each of the decoding modules comprise:

a mixing element configured to mix the remaining single constituent digital signal with a corresponding orthogonal code to produce a correlated digital signal; and an integrator unit configured to integrate the correlated signal to produce a decoded constituent digital signal.

6. The wireless receiver of claim 1 wherein, for each of the SiC banks, the multiple SiC modules are implemented in a serial arrangement to sequentially remove the constituent digital signals from the single encoded digital composite signal until a respective single constituent digital signal remains.

7. The wireless receiver of claim 1, wherein the plurality of SiC banks are implemented a parallel arrangement.

8. The receiver of claim 1, wherein the orthogonal code set comprises Hadamard orthogonal codes.

9. The wireless receiver architecture of claim 1, wherein a code rate of the orthogonal code set is at least an order of magnitude greater than a sampling rate of the received analog signals.

10. A method of processing wireless signals, comprising:
encoding a plurality of received analog signals with an orthogonal code set and combining the encoded analog signals into a single encoded analog composite signal;
converting the single encoded analog composite signal into a single encoded digital composite signal containing constituent digital signals;
sequentially removing, by a plurality of banks of multiple successive interference cancellation (SiC) modules in which each of the multiple SiC banks include multiple SiC modules, the constituent digital signals from the single encoded digital composite signal until, for each of the SiC banks, a different single constituent digital signal remains, wherein each of the multiple SiC modules within each SiC bank is configured to remove a respective one of the constituent digital signals and to provide a succeeding SiC module the single encoded digital composite signal without the removed respective one constituent digital signal; and
decoding, by a plurality of decoding modules in which each of the decoding modules operate to receive the single encoded digital composite signal from a corresponding SiC bank, the remaining constituent digital signal from the single encoded digital composite signal for each of the SiC banks.

11. The wireless processing method of claim 10, further comprising filtering the single encoded analog composite signal to minimize aliasing effects.

12. The wireless processing method of claim 10, wherein each of the multiple SiC modules within the SiC bank comprises:
a first mixing of the single encoded digital composite signal with an orthogonal code corresponding to the particular constituent digital signal;
integrating the mixed encoded digital composite signal;
up-sampling the integrated mixed encoded digital composite signal;
a second mixing of the up-sampled encoded digital composite signal with the corresponding orthogonal code to produce the particular constituent digital signal; and
removing the particular constituent digital signal from the single encoded digital composite signal.

13. The wireless processing method of claim 12, further comprising delaying the single encoded digital composite signal prior to removal to compensate for processing delays.

14. The wireless processing method of claim 10, wherein the decoding of the remaining constituent digital signal comprises:
mixing the remaining single constituent digital signal with a corresponding orthogonal code to produce a correlated digital signal; and
integrating the correlated signal to produce a decoded constituent digital signal.

15. The wireless processing method of claim 10 wherein, for each of the SiC banks, implementing the multiple SiC modules in a serial arrangement to sequentially remove the constituent digital signals from the single encoded digital composite signal until a respective single constituent digital signal remains.

16. The wireless processing method of claim 10, further comprising implementing the plurality of SiC banks in a parallel arrangement.

17. The wireless processing method of claim 10, wherein the encoding of the received analog signals comprises Hadamard orthogonal codes.

18. The wireless processing method of claim 10, wherein a code rate of the orthogonal code set for encoding the received analog signals is at least an order of magnitude greater than a sampling rate of the received analog signals.

* * * * *